United States Patent
Kiribayashi

(10) Patent No.: US 7,493,983 B2
(45) Date of Patent: Feb. 24, 2009

(54) SYSTEM FOR DETECTING PEDESTRIAN COLLIDING WITH VEHICLE

(75) Inventor: Shinichi Kiribayashi, Anjo (JP)

(73) Assignee: Denso Corporation, Kariya (JP)

( * ) Notice: Subject to any disclaimer, the term of this patent is extended or adjusted under 35 U.S.C. 154(b) by 466 days.

(21) Appl. No.: 11/373,876

(22) Filed: Mar. 10, 2006

(65) Prior Publication Data

US 2006/0219461 A1    Oct. 5, 2006

(30) Foreign Application Priority Data

Mar. 29, 2005    (JP)    ............... 2005-094610

(51) Int. Cl.
B60R 21/34    (2006.01)
B60R 21/01    (2006.01)

(52) U.S. Cl. ................................ 180/274; 701/45

(58) Field of Classification Search ................ 180/274, 180/282; 296/187.04; 701/45
See application file for complete search history.

(56) References Cited

U.S. PATENT DOCUMENTS

| 6,516,278 | B1 | 2/2003 | Ishizaki et al. |
| 2002/0180596 | A1* | 12/2002 | Mattes et al. ............... 340/436 |
| 2004/0059487 | A1* | 3/2004 | Lich et al. ..................... 701/45 |
| 2004/0186643 | A1* | 9/2004 | Tanaka et al. .................. 701/45 |

* cited by examiner

*Primary Examiner*—Ruth Ilan
(74) *Attorney, Agent, or Firm*—Harness, Dickey & Pierce, PLC

(57) ABSTRACT

A pedestrian-detecting system mounted on an automotive vehicle includes a touch sensor for detecting a first touch of an object at a collision, an acceleration sensor for detecting deceleration at a collision, a calculator to which outputs of sensors are fed, and an electronic control unit for activating a pedestrian-protecting device when the calculator determines that the vehicle collides with a pedestrian. A time period T from the first touch detected by the touch sensor to a time when deceleration detected by the acceleration sensor reaches its peak is compared with a threshold time period Tth. If the time period T is longer than the time period Tth, it is determined that the vehicle collided with a pedestrian.

6 Claims, 5 Drawing Sheets

SYSTEM FOR DETECTING PEDESTRIAN COLLIDING WITH VEHICLE

CROSS-REFERENCE TO RELATED APPLICATION

This application is based upon and claims benefit of priority of Japanese Patent Application No. 2005-94610 filed on Mar. 29, 2005, the content of which is incorporated herein by reference.

BACKGROUND OF THE INVENTION

1. Field of the Invention

The present invention relates to a system for detecting a pedestrian colliding with an automotive vehicle.

2. Description of Related Art

Recently, it has been required to decrease damages to a pedestrian who collided with an automotive vehicle in addition to protecting passengers in the vehicle. It is most important to avoid a fatal damage to a pedestrian if a collision with a pedestrian occurred unfortunately. An example of a pedestrian-protecting system is disclosed in JP-A-2001-80545. In this system, when a vehicle collides with a pedestrian, a front hood of the vehicle is popped up to suppress a secondary impact. A pedestrian collided with a front portion of the vehicle is often tossed up on the front hood and collides with the popped-up front hood, thereby a secondary impact given to the pedestrian is alleviated because the impact is absorbed by deformation of the front hood.

In the system disclosed in JP-A-2001-80545, a collision with an object with the vehicle is detected based on changes in acceleration imposed on a front bumper. However, it is difficult to determine whether an object collided with the vehicle is a pedestrian or another object. For example, when the vehicle collides with a roadside marker or a post cone, the front hood may be unnecessarily popped up, and the vehicle may become unable to drive safely.

SUMMARY OF THE INVENTION

The present invention has been made in view of the above-mentioned problem, and an object of the present invention is to provide a pedestrian-detecting system that is able to surely detect whether an object collided with a vehicle is a pedestrian or other objects.

The pedestrian-detecting system of the present invention determines whether an automotive vehicle collided with a pedestrian or other objects. The system includes a touch sensor for detecting a first touch or contact of an object with the automotive vehicle, an acceleration sensor for detecting deceleration at a collision, a calculator to which outputs of the touch sensor and the acceleration sensor are fed, and an electronic control unit for activating a pedestrian-protecting device such as a front airbag when the calculator determines that the vehicle collided with a pedestrian.

The calculator calculates a period of time from a time when the touch sensor detects the first touch to a time when an amount of deceleration detected by the acceleration sensor reaches its peak. If the calculated period of time exceeds a threshold period of time, the calculator determines that the vehicle collided with a pedestrian. Since a soft human body absorbs a certain amount of deceleration at a collision, a deceleration peak appears a certain time period after the first touch is detected. In this manner, whether the vehicle collided with a pedestrian or other objects is surely detected. Therefore, the pedestrian-protecting device such as a front airbag is activated only when necessary.

Preferably, the touch sensor and the acceleration sensor are mounted on a front bumper of the automotive vehicle. It is preferable to use plural acceleration sensors disposed in the vicinity of the touch sensor. The plural acceleration sensors may be connected in series or in parallel to each other. The touch sensor may be a stripe having an electric resistance that varies when a pressure is applied. Alternatively, the touch sensor may include a switch that is turned on when a pressure is applied. The calculator and the electronic control unit for activating the pedestrian-protecting device may be combined into a single electronic control unit.

Other objects and features of the present invention will become more readily apparent from a better understanding of the preferred embodiment described below with reference to the following drawings.

DETAILED DESCRIPTION OF THE PREFERRED EMBODIMENT

Figure 1:
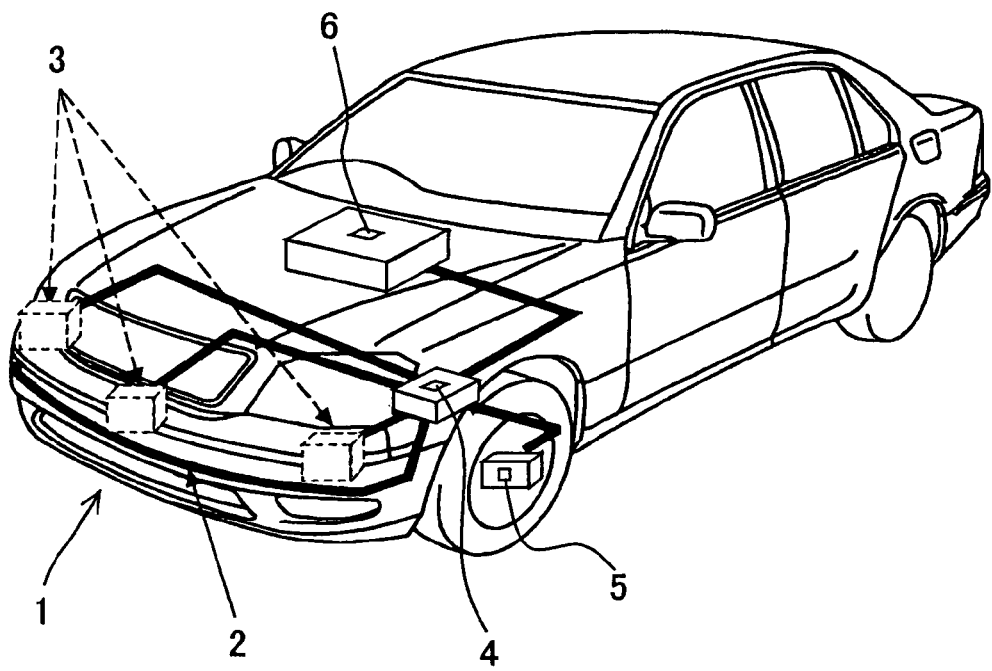
FIG. 1 is a perspective view showing an automotive vehicle on which a pedestrian-detecting system according to the present invention is mounted.

A preferred embodiment of the present invention will be described with reference to accompanying drawings. The pedestrian-detecting system of the present invention is mounted on an automotive vehicle as shown in FIG. 1. The system includes a touch sensor 2 mounted on a front bumper 1, acceleration sensors 3 mounted behind the touch sensor, a calculator 4 for processing signals fed from the sensors, a speed sensor 5 for detecting a driving speed of the vehicle, and an electronic control unit (ECU) 6 for activating a pedestrian-protecting airbag 100 (refer to FIG. 8).

Figure 2:
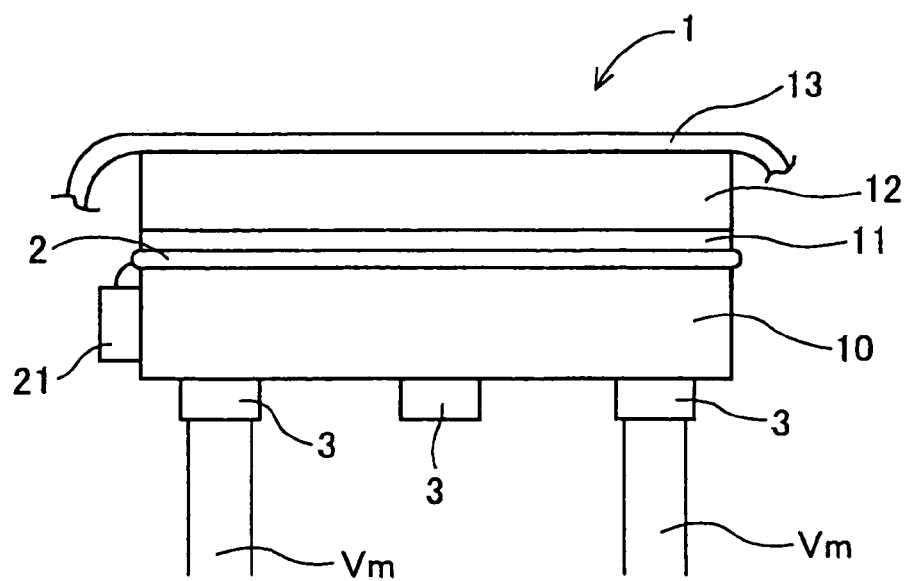
FIG. 2 is a schematic view showing a front part of the vehicle on which the pedestrian-detecting system is mounted.
Figure 3:
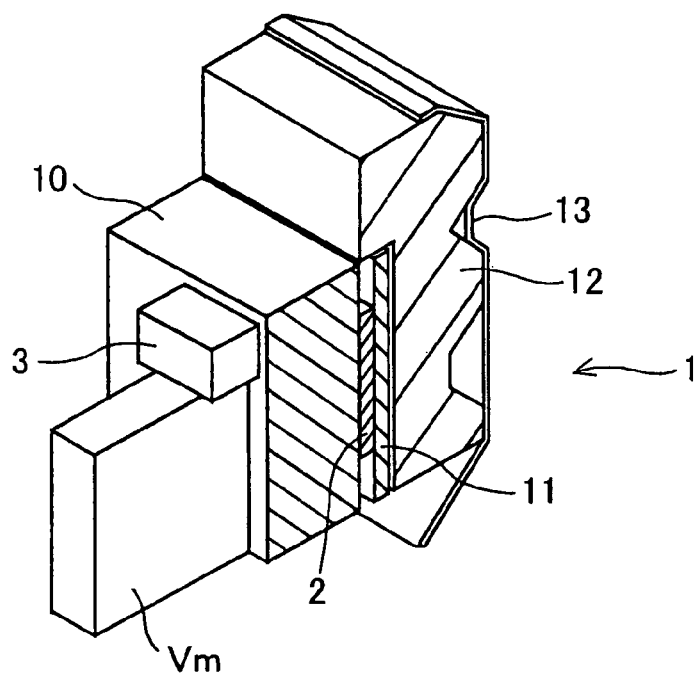
FIG. 3 is a perspective view showing part of a front portion of the vehicle including a front bumper.

A schematic view of the front bumper is shown in FIG. 2 and its partial perspective view is shown in FIG. 3. The front bumper 1 includes a bumper cover 13 disposed at the front most position, an impact absorber 12, a front plate 11, a touch sensor 2, and a reinforcing member 10. These components are positioned in this order from the front. A detector 21 is electrically connected to the touch sensor 2. Three acceleration sensors 3 are positioned behind the reinforcing member 10, one at the center and other two at both sides. The reinforcing member 10 is fixedly connected to side members Vm.

The touch sensor 2 is composed of an electrically conductive rubber stripe, or it may include a switch that turns on when an object touches the bumper 1. Any conventional acceleration sensors can be used as the acceleration sensors 3.

A usual speed sensor for detecting a driving speed of the vehicle is used as the speed sensor 5 for feeding a vehicle speed to the calculator 4. The touch sensor 2 detects a first touch of an object to the bumper 1. The first touch may be detected by turning on a switch in the touch sensor 2 or by changes in conductivity of the rubber stripe. The acceleration sensors 3 connected in parallel to one another detect deceleration G that is caused by deformation of the bumper 1 due to a collision. The detected deceleration G is fed to the calculator 4.

Figure 7:
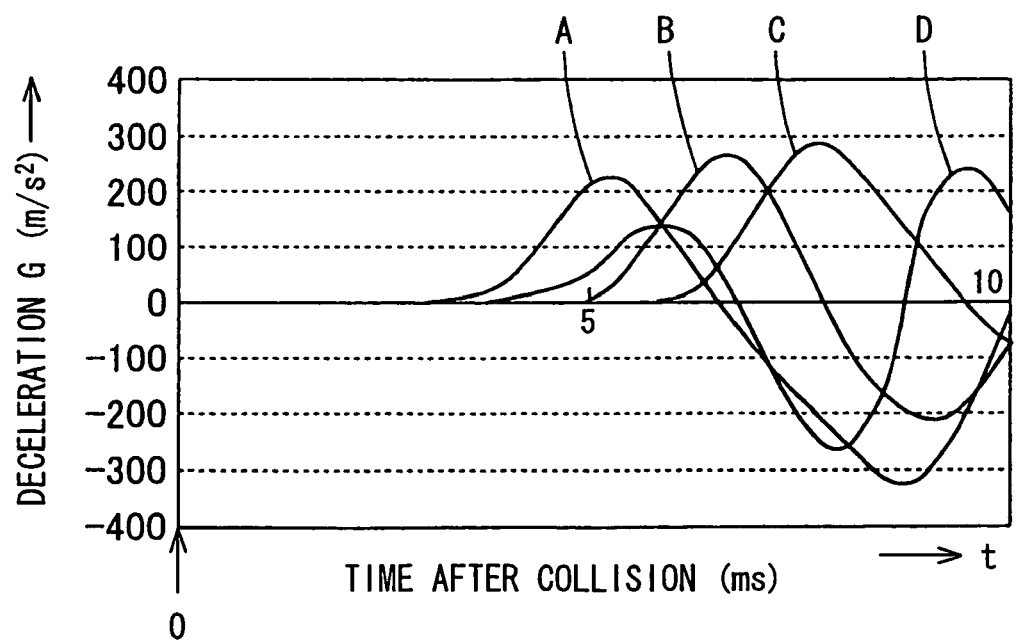
FIG. 7 is a graph showing changes in an amount of deceleration relative to a time period after a colliding object first touched the vehicle.

As shown in FIG. 7, the deceleration G detected at the bumper 1 changes differently according to kinds of objects colliding with the vehicle. The graph shown in FIG. 7 shows changes in the deceleration G after the first touch is detected by the touch sensor 2. The data shown in FIG. 7 are taken when the vehicle collides with various objects at a speed of 25 Kph (kilometer per hour). Graph A shows the deceleration changes in collision with a roadside marker, graph B with a rubber pylon, graph C with a dummy of a 6-year-old child, and graph D with a dummy of an adult. As seen in the graphs, a deceleration peak comes quicker as the colliding object is harder. When the vehicle collides with a human dummy, the deceleration peak appears later, compared with the roadside marker and the rubber pylon. This is because the collision impact is absorbed by a soft human body.

Figure 4:
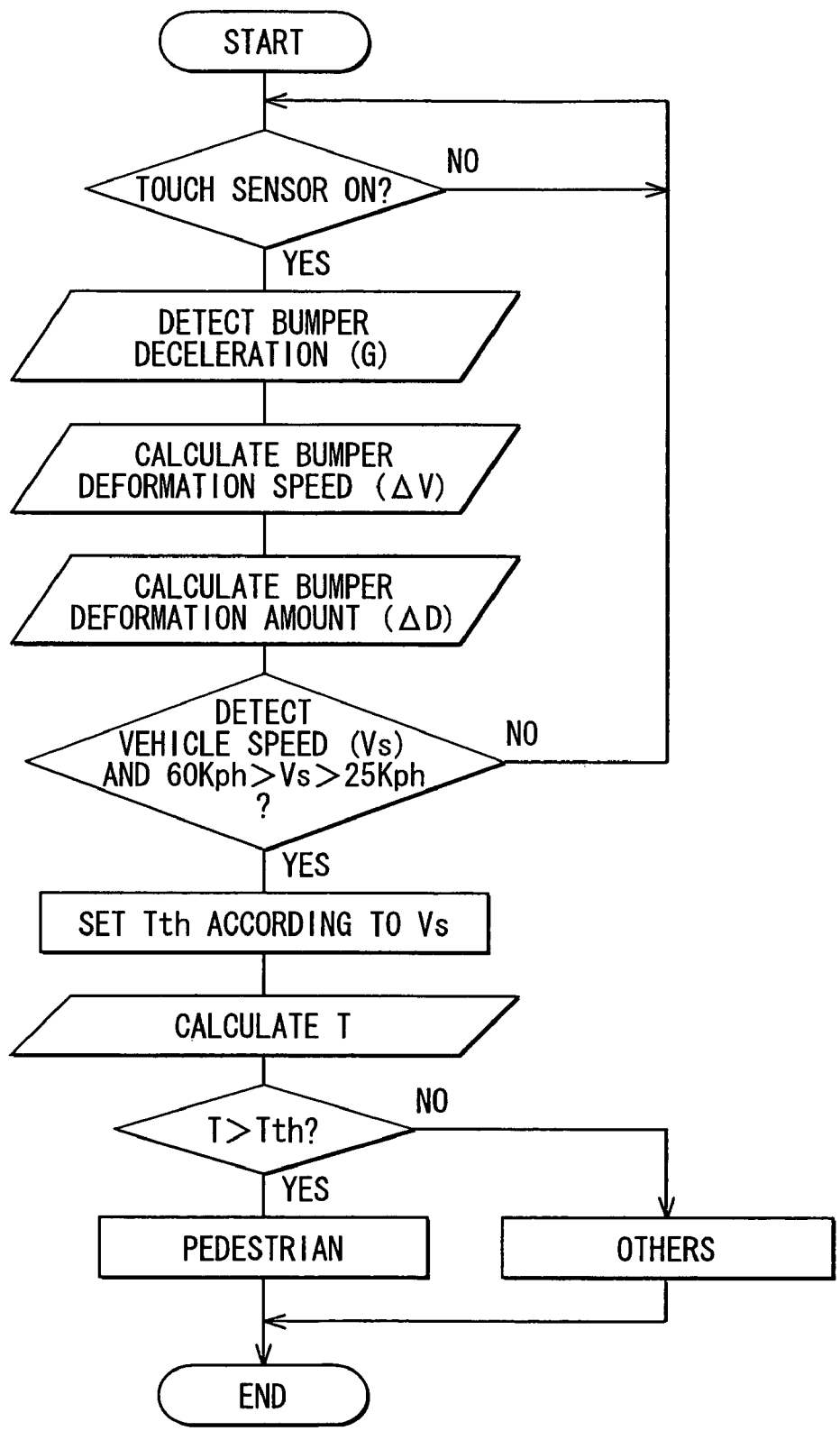
FIG. 4 is a flowchart showing a process of detecting a pedestrian colliding with the vehicle.

Referring to FIG. 4, a process of determining that the vehicle collides with a pedestrian will be described. First, whether the touch sensor 2 detected an object touching the bumper 1 (a first touch) is determined. If the first touch is detected, the process proceeds to the next step, where the deceleration G at the bumper 1 is detected by the acceleration sensors 3. Then, a bumper deformation speed $\Delta V$ is calculated in the calculator 4 by integrating the deceleration G. Then, an amount of a bumper deformation (or a disposition) $\Delta D$ is calculated by further integrating the deformation speed $\Delta V$. Then, a vehicle speed Vs at a collision is detected. Then, a threshold period of time Tth (a period of time from the detection of first touch to a time when a peak of deceleration G appears) for determining a collision with a pedestrian is set according to the vehicle speed Vs.

Figure 8:
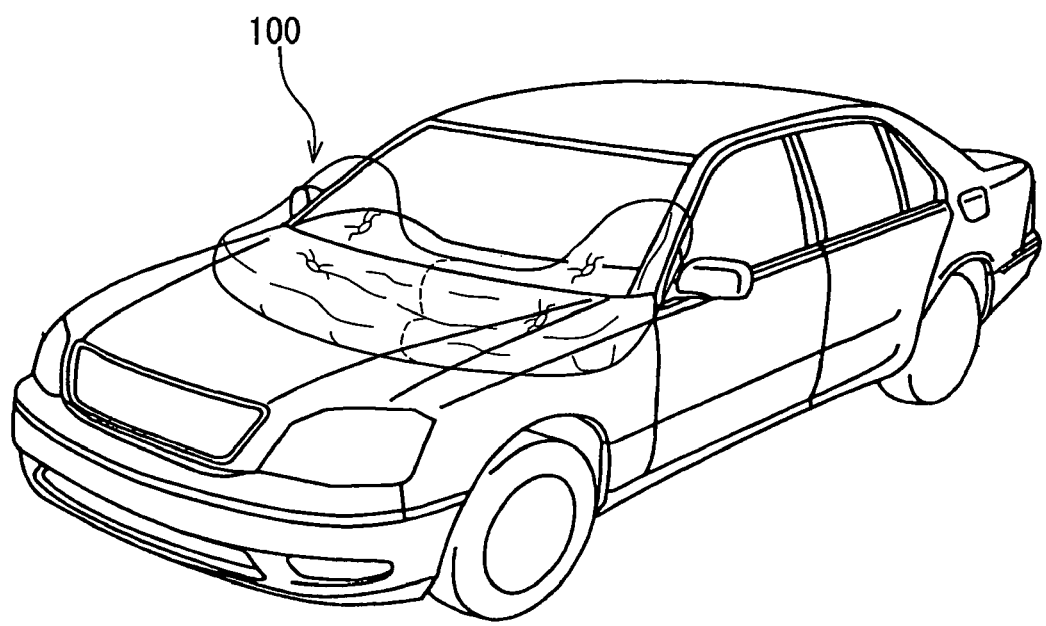
FIG. 8 is a perspective view showing an airbag for protecting a collided pedestrian.

Then, an actual period of time T from the first touch to a time when the deceleration peak appears is calculated. Then, whether T is longer than Tth is determined. If T is longer than Tth, it is determined that the vehicle collided with a pedestrian. If not, it is determined that the vehicle collided with an object other than a pedestrian. Then, the determining process comes to the end. When it is determined that the vehicle collided with a pedestrian, an airbag 100 for protecting a pedestrian is activated on the front hood of the vehicle, as shown in FIG. 8. The collided pedestrian is protected from further damages by the airbag inflated in front of a windshield and on the front hood. It is possible to use pedestrian-protecting device other than the airbag.

Any known type of an acceleration sensor can be used as the acceleration sensor 3. An acceleration sensor for operating an airbag for passengers in a passenger compartment may be used as the acceleration sensor 3 in this system. It is preferable to use plural acceleration sensors 3, as exemplified in the foregoing embodiment, to obtain the accurate deceleration G regardless of positions of a collision. Preferably, the acceleration sensors 3 are disposed in the vicinity of the touch sensor 2 to initiate detection of the deceleration immediately after the first touch is detected by the touch sensor 2. The threshold period of time Tth may be predetermined and memorized in the calculator 4. It is preferable, however, to change the Tth according to a vehicle speed at a collision to accurately detect a collision with a pedestrian.

Whether the vehicle collides with a pedestrian or other objects is determined based on a period of time T between a time when the first touch is detected by the touch sensor 2 and a time when the deceleration G reaches its peak. If the period of time T is longer than the threshold period of time Tth, it is determined that the vehicle collided with a pedestrian. Therefore, the determination is accurately carried out, ant it is avoided that the pedestrian-protecting device is unnecessarily activated. If the pedestrian-protecting device such as the front airbag 100 is activated unnecessarily, such activation is harmful to a safe drive of the vehicle.

Figure 5:
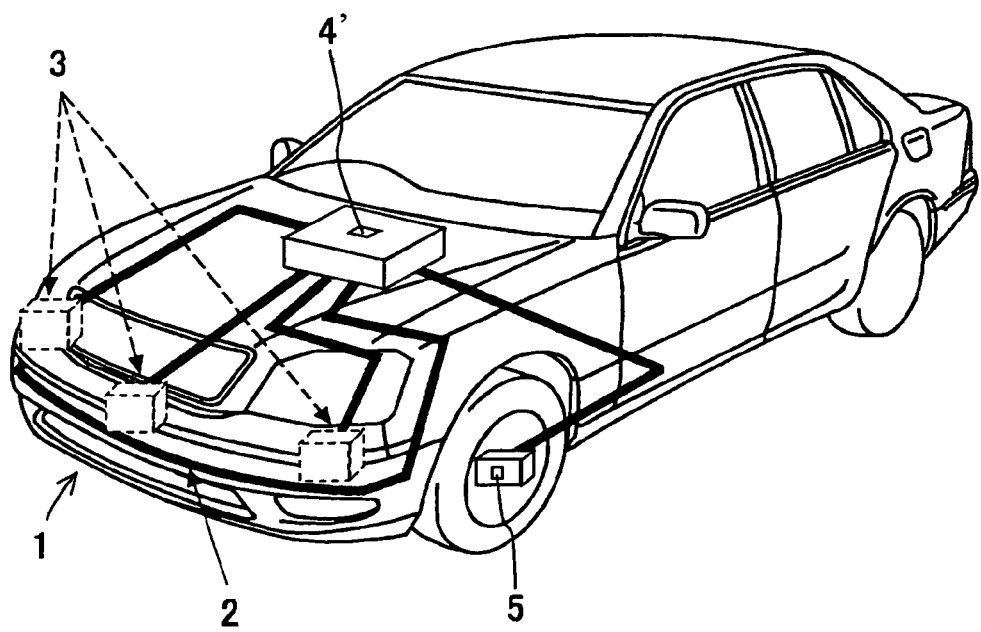
FIG. 5 is a perspective view showing a vehicle on which a modified form of the pedestrian-detecting system is mounted.
Figure 6:
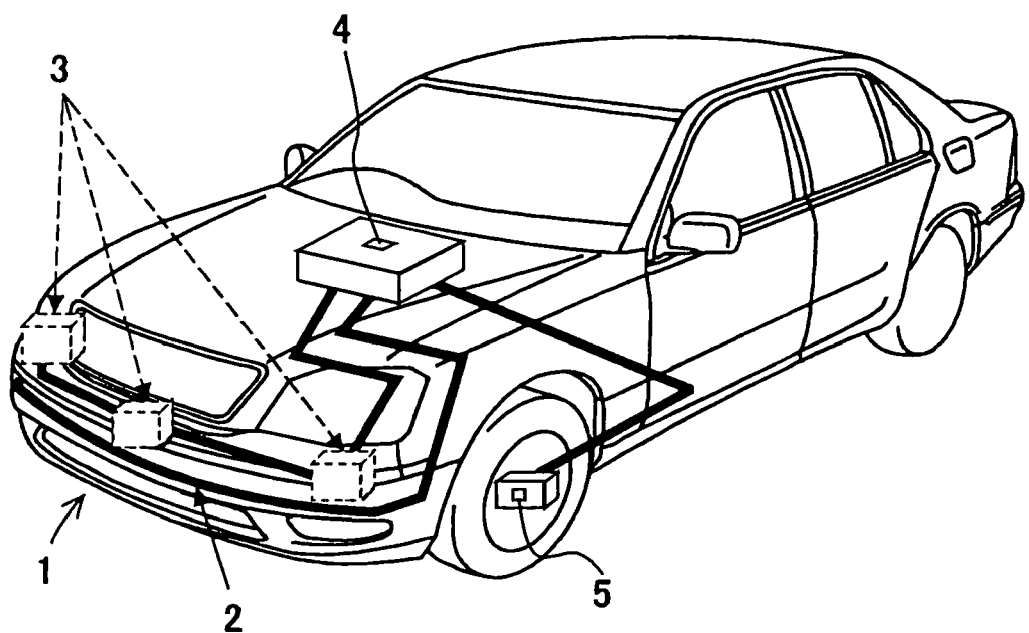
FIG. 6 is a perspective view showing a vehicle on which another modified form of the pedestrian-detecting system is mounted.

The pedestrian-detecting system described above may be modified in forms shown in FIGS. 5 and 6. In FIG. 5, the calculator 4 and the ECU 6 for activating the pedestrian-protecting device are combined to one ECU 4'. In FIG. 6, three acceleration sensors 3 are connected in series instead of connecting them in parallel to one another. Other structures of the modified forms are the same as those of the embodiment described above, and the same advantages are obtained.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A system for detecting whether an object collided with an automotive vehicle is a pedestrian, the system comprising:

a touch sensor mounted on the automotive vehicle for detecting a touch of an object to the automotive vehicle;

an acceleration sensor mounted on the automotive vehicle; and calculating means for determining that the object collided with the automotive vehicle is a pedestrian based on a signal from the touch sensor and outputs of the acceleration sensor; wherein the calculating means determines that the object collided with the automotive vehicle is a pedestrian based on changes in deceleration detected by the acceleration sensor; and the calculating means determines that the object collided with the automotive vehicle is a pedestrian if a period of time between a time when the touch of the object to the automotive vehicle is detected by the touch sensor and a time when an amount of deceleration detected by the acceleration sensor becomes a peak exceeds a threshold period of time.

2. The detecting system as in claim 1, wherein:

the touch sensor is mounted on a front bumper of the automotive vehicle.

3. The detecting system as in claim 1, wherein:

the acceleration sensor is mounted in the vicinity of the touch sensor.

4. The detecting system as in claim 1, wherein:

a plurality of acceleration sensors are mounted on the automotive vehicle.

5. The detecting system as in claim 1, further comprising a vehicle speed sensor mounted on the automotive vehicle, wherein:

outputs of the vehicle speed sensor are fed to the calculating means.

6. The detecting system as in claim 1, wherein:

the threshold period of time is set according to a vehicle speed at a time when the touch of the object is detected.

* * * * *